3,390,190
PROCESS FOR PURIFICATION OF 4,4'-
DIHYDROXYDIPHENYL SULFIDE
Gerard Warren Curtis, Fairlawn, and Edmund Paul Wozniak, Lawrenceville, N.J., assignors to American Cyanamid Company, Stamford, Conn., a corporation of Maine
No Drawing. Filed Mar. 11, 1966, Ser. No. 533,446
5 Claims. (Cl. 260—609)

This invention relates to a process for the preparation of 4,4'-dihydroxydiphenyl sulfide of high purity. More particularly, this invention relates to new procedures for purifying 4,4'-dihydroxydiphenyl sulfide.

4,4'-dihydroxydiphenyl sulfide is a known product described as having utility as an antioxidant for polypropylene rubber and for lubricants. See, for example, Chemical Abstracts 54: 20295f, British Patent No. 737,425 and U.S. Patent No. 2,836,568. In addition, the use of 4,4'-dihydroxydiphenyl sulfide in the preparation of polyester resins as a fungicide, as a disinfectant and as an anthelmintic have been described in published literature.

Several methods for the preparation of this compound have been described heretofore, but to our knowledge none has proven to be entirely satisfactory. Thus, all of the processes of the prior art have yielded product of less than desirable purity and some have created corrosion problems in the manufacturing equipment while others have been subjected to difficulties caused by the evolution of toxic or malodorous fumes.

Thus, in one of the methods of the prior art, the reaction is carried out by adding sulfur dichloride in carbon tetrachloride to a solution of phenol in carbon tetrachloride. This method produces about 86% yield of crude product, which on recrystallization as from chlorobenzene is transformed into about a 72% yield 91% pure product.

In a second process wherein phenol is treated with thionylchloride only about a 40% yield of crude product is obtained.

In a third process and a preferred procedure, up until the time of our invention, 4,4'-dihydroxyphenyl sulfide is prepared by reacting phenol dissolved in toluene with sulfur dichloride dissolved in toluene. During the reaction, the mixture is continuously stirred and the temperature thereof maintained at about 0° C., thereafter in accordance with this procedure the temperature is adjusted to about 30° C., stirred for an additional hour, cooled, filtered and the filter cake washed with toluene. Recrystallization from fresh toluene yields about 60% of product, having a purity of about 90%.

The contaminants in such a product include 4,4'-dithiophenol; 4,4'-trithiodiphenol; 2,2'-thiodiphenol; tris(p-hydroxyphenyl) sulfonium chloride; 2,2'-dithiodiphenol; 2,4'-thiodiphenol phenol and chlorinated compounds such as chlorinated sulfur containing phenolic compounds.

In the present specification, the use of the expression "4,4'-dihydroxydiphenyl sulfide prepared by reacting phenol and sulfur dichloride in toluene" and similar expressions are intended to refer to processes of the type described hereinabove and hereinafter in the examples in which one or more of the contaminants 4,4'-dithiodiphenol; 4,4'-trithiodiphenol; 2,2'-thiodiphenol; tris(p-hydroxyphenol) sulfonium chloride; 2,2'-dithiodiphenol; 2,4'-thiodiphenol phenol and chlorinated compounds are present with the sulfide to be purified. Normally such compositions will contain between about 70 and 90% of the desired product.

These contaminants structurally are quite similar to and have a pKa close to that of the desired product 4,4'-dihydroxydiphenyl sulfide. Thus, they have been difficult to separate from the desired product and their removal has posed a challenge to those seeking a highly pure product.

It is in meeting this challenge that the present invention is concerned.

Accordingly, it is the object of the present invention to provide a process for the production of high purity 4,4'-dihydroxydiphenyl sulfide.

It is a further object of the present invention to provide a simple, economical, and effective means for producing a high purity 4,4'-dihydroxydiphenyl sulfide.

It is a particular object of the present invention to provide a process for the production of high purity 4,4'-dihydroxydiphenyl sulfide, which lends itself particularly to this product when it is prepared by reacting phenol and sulfur dichloride in toluene.

These and other objects and advantages of the present invention will be become more apparent from the detailed description thereof which is set forth hereinbelow.

According to the present invention, a process for preparing high purity 4,4'-dihydroxydiphenyl sulfide is provided which comprises refluxing a contaminated or impure sulfide composition preferably prepared by reacting phenol and sulfur dichloride in toluene until an oily residue is formed, and thereafter separating the oily residue from the solution and recovering the purified product from said solution.

By the term "contaminated sulfide" as it is employed hereinabove, it is meant a 4,4'-dihydroxydiphenyl sulfide composition containing unreacted reactants and various sulfides closely related to the above compound, such as are described as being prepared by reacting sulfur dichloride and phenol in toluene as described above and in the examples hereinafter. Normally, the "contaminated sulfide" composition will contain between 70 and 90% of the desired product.

Normally, refluxing will occur at a temperature between 100 and 120° C. at atmospheric pressure. While it is not fully understood why refluxing in toluene should prove so significant in obtaining the desired product in a highly purified form, it is believed that refluxing reduces the quantity of polysulfides in solution by decomposing them enabling them to be more readily removed. In addition, refluxing frees an oily sulfonium compound, probably tris(p-hydroxyphenyl) sulfonium chloride from the crystals of product. When the hot toluene solution settles, an oily layer separates from the hot solution which can be easily decanted.

After refluxing, the toluene solution is cooled and the product crystallizes. The product may be recrystallized more than once to improve its purity still further.

By employing the refluxing procedure described above, the purity of a contaminated composition may be readily improved up to 90 to 98% pure product.

While the refluxing procedure set forth above may be employed to obtain high purity of 4,4'-dihydroxydiphenyl sulfide from a contaminated composition of the same, we have discovered that when a refluxed composition from which oily residues have been removed is further processed by being dissolved in a heated inorganic alkaline solution and is subsequently cooled, that a highly purified product crystallizes which may be readily filtered and recovered.

Both the refluxing stage and the heated alkaline treatment may be employed separately or in combination, in the sequence of first refluxing in toluene followed by the alkaline treatment.

The heated alkaline solution employed is a solution of a weak inorganic base material such as sodium carbonate, potassium carbonate, potassium bicarbonate-potassium carbonate mixtures, sodium bicarbonate-sodium carbonate mixtures, sodium hydrogen phosphate-sodium phosphate mixtures and potassium hydrogen phosphate-potassium phosphate mixtures. In addition to the above, alkali metal hydroxides can be employed so long as the pH is properly controlled.

These solutions normally have a pH from about 10 to 11, inclusive, and when such hot alkaline solutions of the sulfides are cooled the 4,4'-dihydroxydiphenyl sulfide readily precipitates therefrom.

In order to further increase the purity, the crystallized sulfide product may be washed with a fresh dilute solution of weak base followed by a subsequent washing with water.

While we are not sure of the mechanism by which the alkaline compounds produce pure 4,4'-dihydroxyphenyl sulfide, we believe that the alkaline materials form soluble salts of the contaminant polysulfides, which permits their ready removal in solution from the crystalline sulfide product. Apparently the polysulfides and chlorinated compounds are more acidic than the sulfide product, and therefore more readily form the soluble salts than does the product, thus permitting their separation in this matter.

In a preferred embodiment of this invention where both refluxing and alkaline treatment are employed, a solution of phenol in toluene cooled to between about +15° C. and −15° C. is treated with a solution of sulfur dichloride in toluene to form crude 4,4'-dihydroxyphenyl sulfide. This mixture is then refluxed in the toluene until the contaminating oils and tars form a separate phase in the refluxing solution. These oils and tars are then removed from the solution, and it is permitted to cool. On cooling, the purified product crystallizes and is filtered and recovered.

Following filtration, the crystallized product is processed by treating with a heated aqueous alkaline solution in the manner described above to produce the desired sulfide in a high degree of purity.

It should be noted that both the refluxing procedure and the alkaline treatment are highly effective means for producing sulfide of improved purity, but only by the combined treatment can highly purified product sulfide be achieved at high overall yield. This is at least in part believed to be true in that prior processing by refluxing seems to remove certain contaminants which otherwise interfere with the hot alkaline treatment.

Some of the more obvious advantages of the present process include the significantly increased product purity, reduction of corrosion problems as through hydrogen chloride removal, improved filtration or centrifuging rates through the elimination of oily contaminants, a filter cake containing less mother liquor and improved product obtained through the elimination of contaminants.

In order that the present invention may be more fully understood, the following examples are given primarily by way of illustration. No specific details or enumerations contained therein should be construed as limitations on the present invention, except insofar as they appear in the appended claims. All parts and percentages are by weight unless otherwise specifically designated.

Example 1.—Preparation of 4,4'-dihydroxydiphenyl sulfide conventional isolation

To a stirred solution of 200 grams or reagent grade phenol in 400 ml. of toluene, cooled to 0° C., is added a solution of 87.7 grams of technical grade sulfur dichloride in 150 ml. toluene. Addition is made over a period of three hours and the temperature during addition is maintained at about 0° C. to 5° C.

After addition the solution is warmed to 30° C. and stirred at this temperature for 30 minutes, then filtered. The filter cake is washed with four 100 ml. portions of toluene precooled to 0° C.

The yield of product after oven drying is 145.4 grams.

The product contains 86.87% 4,4'-dihydroxydiphenyl sulfide, 9.5% isomeric dihydroxydiphenyl polysulfides and 0.63% chlorine (reflecting chlorinated phenols and sulfonium chloride). Real yield of product is 55.2% of theory.

Example 2.—Purification of 4,4'-dihydroxydiphenyl sulfide—by alkaline treatment 50 grams of crude 4,4'-dihydroxydiphenyl sulfide made in accordance with the procedure of Example 1 and containing 86.02% 4,4'-dihydroxydiphenyl sulfide and 7.7% isomeric dihydroxydiphenyl disulfides is dissolved in 250 ml. of 10% sodium carbonate solution at 80–85° C., held for fifteen minutes, and cooled to room temperature.

After standing overnight at room temperature, the product is filtered and washed with two 25 ml. portions of 10% sodium carbonate solution and then with 200 ml. of water. The pH of the filtrate is 10.04 and the pH of the washings 10.17.

The yield of 4,4'-dihydroxydiphenyl sulfide is 37.1 grams. The product contains about 99% 4,4'-dihydroxydiphenyl sulfide, about 1% of dihydroxydiphenyl polysulfides and about 0.1% chlorine.

The yield (real) is 85.8% of theoretical based on the 4,4'-dihydroxydiphenyl sulfide content of the crude material charged to the purification process.

Example 3.—Purification of 4,4'-dihydroxydiphenyl sulfide by alkaline treatment

Following the procedure of Example 1, 4,4'-dihydroxydiphenyl sulfide containing 80.6% 4,4'-dihydroxydiphenyl sulfide, 13.8% of dihydroxydiphenyl polysulfides and 0.6% chlorine (from chlorinated phenols and sulfonium chloride) is prepared.

306.4 pounds of 10% by weight sodium carbonate solution is heated to 80° C. and to this is added with stirring 77.5 lbs. of the above 4,4'-dihydroxydiphenyl sulfide. A small amount of undissolved impurities is filtered out at 80–85° C. and the filtrate is cooled to room temperature to crystallize the product.

The product is then filtered, washed on the filter with 68.5 lbs. of 10% sodium carbonate solution and then with water.

The yield of dry product is 53.5 lbs. It contains 98.8% of 4,4'-dihydroxydiphenyl sulfide, 2.3% of dihydroxy-diphenyl polysulfides, 0.04% chloride (from chlorinated phenols and sulfonium chloride) and melts at 152.2 to 153.0° C. Real yield is 84.6% of theory.

Example 4.—Ratio of 10% sodium carbonate solution to crude 4,4'-dihydroxydiphenyl sulfide The data recorded in Table I below illustrates a range of ratios of 10% sodium carbonate solution to crude 4,4'-dihydroxydiphenyl sulfide over which the carbonate treatment of this invention gives good results.

It does not, however, fix the upper and lower limits of the ratios that produce good results. The lower limit of the range is determined by the purity of the crude 4,4'-dihydroxydiphenyl sulfide to be purified and also by the pH of the slurry obtained when the purified 4,4'-dihydroxydiphenyl sulfide has been crystallized from the sodium carbonate solution. As the ratio of 4,4'-dihydroxydiphenyl sulfide to sodium carbonate solution increases, the pH of the final slurry to be filtered decreases, and since purification is accomplished by removal of impurities as soluble sodium salts, a deficiency of sodium carbonate will result in incomplete removal of impurities.

In most of the experiments the pH of the final slurry before filtering off the purified product is in the range of 10.0 to 10.1. The pH of a 10% solution of sodium carbonate is about 11. At high ratios of sodium carbonate to 4,4'-dihydroxydiphenyl sulfide, when the amounts of impurities are not sufficient to lower the pH of the slurry to 10.0 to 10.1, a loss in yield results due to higher solubility of 4,4'-dihydroxydiphenyl sulfide at the upper end of the pH range 10.0 to about 11.

Various weight ratios of 10% sodium carbonate to crude 4,4'-dihydroxyphenyl sulfide are tested using the same starting material and purification procedure described in Example 3 above.

to 25° C. then filtered, washed with fresh toluene and dried as described above.

TABLE I.—PURIFICATION OF 4,4-DIHYDROXYDIPHENYL SULFIDE

| Grams crude 4,4'-dihydroxy-diphenyl sulfide | Ml. 10-sodium carbonate | Solution temp., °C. | pH of filtrate at 25° C. | pH of sodium carbonate washings | Yield grams as is | Percent 4,4' dihydroxy-diphenyl sulfide | Percent polysulfides [1] | Percent total chlorine | Real yield, percent of therory based on 4,4'-dihydroxydi-phenyl sulfide content of starting material |
|---|---|---|---|---|---|---|---|---|---|
| 50.0 | 200 | 79 | 10.04 | 10.13 | 39.4 | 97.4 | 1.1 | 0.06 | 89.2 |
| 50.0 | 250 | 75 | 10.17 | 10.17 | 37.1 | 99.5 | 1.2 | 0.09 | 85.5 |
| 50.0 | 300 | 73 | 10.19 | 10.19 | 38.0 | 98.9 | 1.7 | 0.04 | 87.5 |
| 50.0 | 400 | 69 | 10.19 | 10.19 | 37.4 | 97.0 | 2.0 | 0.06 | 84.3 |

[1] Determined polarographically sulfides.

Example 5.—Purification of 4,4'-dihydroxydiphenyl sulfide by alkaline treatment

The improved process for the purification of 4,4'-dihydroxydiphenyl sulfide is further demonstrated by the following tests wherein 50 grams of crude, 4,4'-dihydroxydiphenyl sulfide analyzing 76.6% 4,4'-dihydroxydiphenyl sulfide, 15.1% polysulfides and 0.84% chlorine (from chlorinated phenol and sulfonium chloride) are dissolved in 200 ml. of 10% sodium carbonate solution heated to 80–85° C., then cooled to room temperature to crystallize the product.

The slurry is filtered, washed with 400 ml. of water, dried and analyzed.

The experiment is repeated with the single exception that the filter cake is washed with two 25 ml. portions of 10% sodium carbonate solution before washing it with water. The results which appear in table form below clearly demonstrate the effectiveness of the process of the invention for purifying 4,4'-dihydroxydiphenyl sulfide.

They further show the beneficial effect of the sodium carbonate wash for removal of mother liquor prior to water washing of the crystallized product.

The results are recorded in Table II below.

TABLE II.—ANALYSIS

| Treatment | Yield grams as is | 4,4'-di-hydroxy-diphenyl sulfide | Percent poly-sulfides | Percent Cl |
|---|---|---|---|---|
| Crude product prepared in accordance with previously described procedures | | 76.58 | 15.1 | 0.84 |
| Water wash only | 36.1 | 94.4 | 6.6 | 0.08 |
| Sodium carbonate wash followed by water wash | 34.0 | 96.2 | 3.4 | 0.11 |

Example 6.—Purification of 4,4'-dihydroxydiphenyl sulfide by refluxed toluene procedure To 547 parts of toluene, cooled to −15° C., are added 235 parts of phenol. A mixture of 116 parts of sulfur dichloride in 182 parts of toluene, are then admixed with the above solution over a period of three hours. During addition batch temperature is maintained at −15° C. After the addition of the sulfur dichloride/toluene mixture is complete, the batch temperature is gradually raised to 30° C. over a 50-minute period and held at 30° C. for one hour.

Following the holding period the reaction slurry is divided into equal parts. One part is filtered on a Buchner funnel, washed with fresh toluene and then air and oven dried to constant weight. The remaining portion of the slurry is heated to reflux (ca. 111° C.) and then cooled to effect crystallization.

During the cooling some oils and tars adhere to the sides of the flask, and it is observed that crystallization occurs voluminously at about 85° C. The slurry is cooled Tabulated below in Table III is a comparison of the results obtained using the two different methods of product isolation.

TABLE III

| | Parts Prod. | Percent 4,4'-di-hydroxydi-phenyl sulfide | Percent polysulfide | Percent Solids in wet cake |
|---|---|---|---|---|
| Normal | 101 | 86.3 | 7.7 | 33.3 |
| Heat to Reflux | 89 | 93.0 | 2.4 | 65.0 |

Example 7.—Purification of 4,4'-dihydroxydiphenyl sulfide by refluxed toluene procedure Following the procedure of Example 6, 282 parts of phenol admixed with 656 parts of toluene and cooled to 0° C. are treated over a three hour period with a mixture of 108 parts of technical sulfur dichloride in 219 parts of toluene. Batch temperature is maintained at 0° C. during the addition and mixing is employed.

After the addition of sulfur dichloride/toluene is complete, the batch temperature is gradually raised to 30° C. over a 30 minute period.

The reaction slurry is then divided into two parts; one part is filtered, washed with fresh toluene and then air and oven dried to constant weight. The other part is heated to reflux in the toluene then cooled to effect crystallization. During crystallization oils and tars separate from the crystalline product and are removed. The product is then washed with fresh toluene and analyzed.

Tabulated results are set forth in Table IV below.

TABLE IV

| | Parts Prod. | Percent 4,4'-di-hydroxydi-phenyl sulfide | Percent polysulfide | Percent Solids in wet cake |
|---|---|---|---|---|
| Normal | 85 | 93.5 | 9.3 | 29.4 |
| Heat to Reflux | 81 | 97.6 | 3.5 | 39.5 |

Example 8.—Preparation of high purity 4,4'-dihydroxydiphenyl sulfide by refluxing toluene procedure followed by alkaline treatment In the following preparation 282.3 grams of phenol in 656.3 grams of toluene are charged to a vessel equipped with a heavy duty agitator. The vessel and content therein are cooled to about 0° C. and 123.6 grams of sulfur dichloride in 218.7 grams of toluene are slowly admixed with the above solution over a three hour period. During such addition period the temperature of the solution is maintained at about 0° C. On completing the addition the temperature of the solution is raised to 30° C. and held at this temperature for one hour.

The solution is then heated to refluxing temperature (112° C. to 114° C.) and refluxed for about five minutes. After refluxing, the mixture is cooled to about 25° C. During cooling 4,4'-dihydroxydiphenyl sulfide crystallizes out of solution.

The entire batch is then filtered and the crystalline product washed with 500 ml. of fresh toluene. 414 grams of wet cake are recovered and dried. 197.5 grams of product are obtained.

Analysis of this product by ultraviolet method shows it to be 95.8% 4,4'-dihydroxydiphenyl sulfide. Consequently, a 57.8% real yield of product based on phenol is obtained.

63.8 grams of this product are then charged to a 400 ml. beaker along with 25.5 grams of sodium carbonate and 229.7 grams of distilled water. The mixture is heated to about 83° C. and then cooled slowly to effect crystalization. When the slurry is cooled to approximately 25° C., it is centrifuged on a laboratory basket centrifuge and washed with 115 ml. of distilled water. 62.0 grams of wet cake are recovered and oven dried to a constant weight of 54.8 grams.

The product is analyzed by ultraviolet method and 100% 4,4'-dihydroxydiphenyl sulfide is obtained. This corresponds to 90% recovery of product based on the weight of product used by the sodium carbonate treatment.

While the illustrative examples of the processes of this invention are carried out at atmospheric pressure, they may be carried out at superatmospheric conditions. In addition, while the illustrative examples are directed primarily to batch processing, the process is capable of being rendered continuous or semicontinuous.

We claim:

1. Process for preparing high purity 4,4'-dihydroxydiphenyl sulfide which comprises refluxing said sulfide in toluene, cooling said solution to crystallize said sulfide, and separating said purified sulfide crystals from said solution.

2. A process according to claim 1, in which the 4,4'-dihydroxydiphenyl sulfide is prepared by reacting phenol and sulfur dichloride in toluene.

3. A process according to claim 1, wherein the 4,4'-dihydroxydiphenyl sulfide is the major component in a composition having present in minor amount a compound selected from the group consisting of 4,4'-dithiophenol, 4,4'-trithiodiphenol, 2,2'-thiodiphenol, tris(p-hydroxyphenyl) sulfonium chloride, 2,2'-dithiodiphenol, 2,4'-thiodiphenol and chlorinated sulfur containing phenolic compounds.

4. A process according to claim 1, wherein said sulfide purified by refluxing in toluene followed by crystallization is further treated by dissolving said sulfide in a heated inorganic alkaline solution after which it is subsequently cooled to crystallize the sulfide and thereafter separating the crystalline product from the alkaline solution.

5. A process according to claim 4, in which the alkaline solution is selected from the group consisting of aqueous solutions of sodium carbonate, potassium carbonate, potassium bicarbonate-potassium carbonate mixtures, sodium bicarbonate-sodium carbonate mixtures, sodium hydrogen phosphate and sodium phosphate mixtures and potassium hydrogen phosphate-potassium phosphate mixtures.

References Cited

UNITED STATES PATENTS 3,277,183  10/1966  Heller _____ 260—609 XR

OTHER REFERENCES

Dunning et al.: "J.A.C.S." vol. 53, pp. 3466–3469 (1931), QDIAS.

CHARLES B. PARKER, *Primary Examiner.*

D. ROSS, D. PHILLIPS, *Assistant Examiners.*